Feb. 28, 1956 A. C. MUNSTER 2,736,891
METHOD OF AND MEANS FOR MEASURING DISTANCE
Filed Feb. 8, 1952

INVENTOR
ALLEN C. MUNSTER
BY Brown, Jenks & Lynnestvedt
AGENTS

United States Patent Office 2,736,891
Patented Feb. 28, 1956

2,736,891

METHOD OF AND MEANS FOR MEASURING DISTANCE

Allen C. Munster, Hatboro, Pa., assignor to Philco Corporation, Philadelphia, Pa., a corporation of Pennsylvania Application February 8, 1952, Serial No. 270,556

16 Claims. (Cl. 343—12)

The invention herein described and claimed relates to electromagnetic distance measuring systems and more particularly to low altitude measuring systems suitable for use on aircraft.

Systems have been proposed for automatically landing aircraft on a runway once the aircraft has been brought to some low altitude, for example under one hundred feet, along a preselected approach path. Such systems require that the altitude of the plane and the rate of change of altitude be precisely known and continuously indicated. To meet the requirements of a typical aircraft landing system, the altitude of the aircraft must be measured to within a fraction of a foot, for example to within six inches.

Aircraft altimeters now in general use are generally of the type in which a carrier wave, freqeuncy modulated by a periodic signal, is transmitted toward the earth's surface and then received after reflection from the earth's surface. The transmitted and received signals are then applied to a suitable mixer to obtain a beat frequency proportional to the time interval between transmission and reception and, therefore, proportional to the altitude of the aircraft. To measure altitude to within six inches with such a system requires a total frequency deviation of approximately 1000 mc. While such a deviation can be obtained at microwave frequencies, the equipment required for generating such a signal becomes quite complex. Such a system is also subject to the further disadvantage that any spurious signal within the required 1000 mc. band may cause the altitude measuring system to become inoperative.

Therefore, it is an object of the present invention to provide an improved low altitude measuring system.

A further object of the invention is to provide a new method of and means for measuring relatively short distances by means of electromagnetic energy.

Still another object of the present invention is to provide an improved low altitude measuring system in which the sensitivity increases as the altitude to be measured decreases.

These and other objects of the invention which will be suggested by the following description and the drawings are generally accomplished by providing a closed loop, self-oscillatory, electrical system in which the frequency of oscillation is at least partially controlled by the time required to propagate an electromagnetic energy signal over the distance to be measured. Preferably, the generated signal is applied as a modulation signal to a super-high or microwave carrier signal for transmission over the distance to be measured.

For a better understanding of the present invention, reference should be made to the following detailed description and the accompanying drawings in which.

Figure 1:
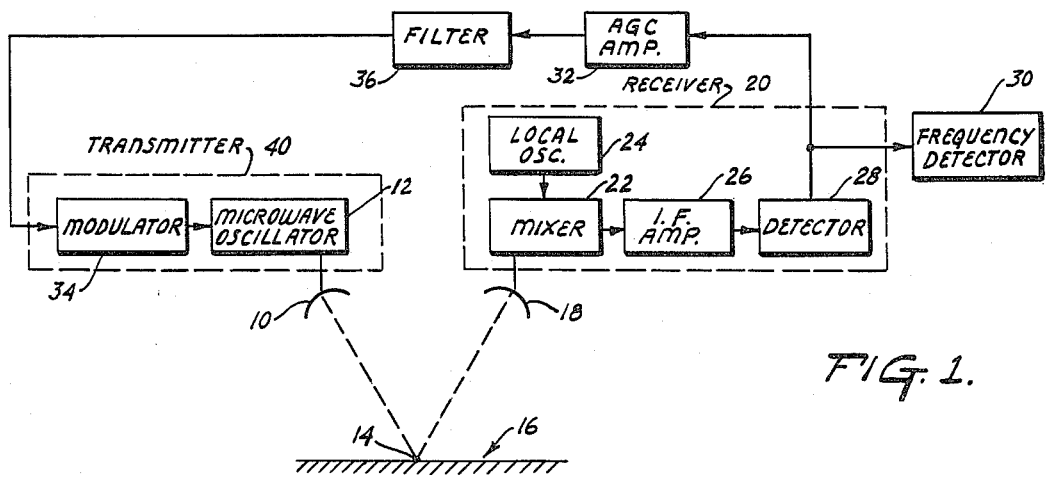
Fig. 1 is a block diagram of a preferred embodiment of the present invention.

The novel method of measuring distance, and particularly altitude, disclosed and claimed herein will best be understood by a consideration of the circuit of Fig. 1 which illustrates one system but not the only system that may be used to put the method into effect. As shown in Fig. 1, a directive antenna 10, energized by an oscillator 12, is oriented to cause the energy radiated therefrom to strike a point 14 on a reflective boundary generally illustrated at 16. If the system is to be employed as a low altitude measuring system for aircraft, antenna 10 would be located on the underside of the aircraft and point 14 would be the point on the surface of the earth directly beneath the aircraft. A directive receiving antenna 18, also located on the aircraft if the system is to be used for low altitude measurement, is oriented to receive energy reflected from point 14. The path of the energy from antenna 10 to point 14 and then to point 18 will hereinafter be referred to as a "space link" since it links the output of the system at antenna 10 to the input of the system at antenna 18 through a path in space.

Antennas 10 and 18 should be sufficiently directive to confine the energy in the space link to a path along the distance to be measured. In addition, if the system is employed to measure altitude, the directivity and the relative locations of antennas 10 and 18 should be such that the signal received at antenna 18 after reflection from point 14 is always larger than any energy coupled directly from antenna 10 to antenna 18. The direct coupling of energy from antenna 10 to antenna 18 may be minimized by locating the antennas on parts of the aircraft shielded from one another by the fuselage of the aircraft. Additional shielding may be added or suitable bridge circuits may be coupled between the transmission lines feeding the two antennas if the direct coupling of energy cannot be sufficiently reduced in the manner suggested above.

The reflection at point 14 is not essential to the operation of the system of Fig. 1. The only requirements of the portion of the system thus far described are that antenna 10 be positioned at the initial point of the distance to be measured, that antenna 18 be positioned at the terminal point of the distance to be measured and that the space link lie along, or be equal in length to, the distance to be measured. If the system is employed to measure altitude, the distance measured is the round trip distance from the aircraft to the ground and from there back to the aircraft. Altitude is determined by dividing this round trip distance by the factor two to obtain the one-way distance from the aircraft to the ground.

The fact that antennas 10 and 18 should be directive and yet be of a size that may be conveniently carried in an aircraft dictates that oscillator 12 operate in the super-high or microwave frequency bands. However, the frequency of oscillator 12 may be arbitrarily chosen from these regions of the radio frequency spectrum to best suit the needs of the particular embodiment of the invention.

The signal from receiving antenna 18 is supplied to a receiver designed to operate at the frequency selected for oscillator 12, the elements forming the receiver being grouped within dashed line 20. The signal radiated from antenna 10 may be amplitude, phase or frequency modulated and receiver 10 is designed to detect and amplify the modulation component. In accordance with conventional practice, receiver 20 may include a mixer 22 receiving signals from antenna 18 and from a local oscillator 24 and supplying a modulated, intermediate frequency signal to intermediate frequency amplifier 26. A detector 28, which may be a discriminator in the case of a frequency modulated signal, or any one of the well known types of diode and triode detectors in the case of an amplitude modulated signal, is coupled to the output intermediate frequency amplifier 26.

The useful portion of the signal from detector 28 is the modulation component of the original signal transmitted over the space link between antennas 10 and 18. A frequency detector 30 is provided to measure and indicate the frequency of this modulation component. If the system of Fig. 1 is to be used in conjuction with an approach course computer in an aircraft, it will usually be desirable that frequency detector 30 have an output in the form of an electrical signal. It will be apparent that a simple discriminator or cycle counter may be employed to provide such a signal. If a visual indication of the measured distance is desired, the output of the discriminator or cycle counter may be applied to a suitable meter.

Figure 3:
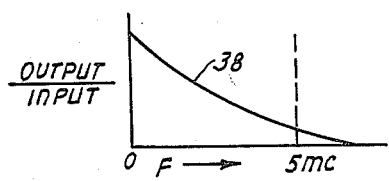
Fig. 3 is a plot illustrating the frequency response characteristic of one element of the system of Fig. 1.

An amplifier 32, which includes an automatic gain control circuit, is provided for amplifying the output of detector 28 and for maintaining the amplitude of the amplified modulation component at a fixed value regardless of variations in gain of attenuation in the remainder of the circuit or in the space link. The output of amplifier 32 is applied to a modulator 34 through a low pass filter 36. Filter 36 may be a simple π or T network including series inductance and shunt capacitance. The frequency response characteristic of a suitable embodiment of filter 36 is shown in Fig. 3. In Fig. 3 curve 38 is a plot of the ratio of signal output to signal input of filter 36 as the ordinate against the frequency of the signal applied to filter 36. Filter 36 should be designed so that the maximum frequency passed by this filter is equal to, or only slightly greater than, the zero distance frequency of the system.

It is not essential to the operation of the present invention that amplifier 32 and filter 36 exist as separate, identifiable units. The functions of these two last mentioned elements of the system of Fig. 1 may be combined with, or included in, either or both of intermediate frequency amplifier 26 and detector 28.

Modulator 34 and microwave oscillator 12 together make up a typical phase, frequency or amplitude modulated transmitter as represented by the inclosing dashed line 40. The main requirement of transmitter 40 is that it supply to antenna 10 an electromagnetic signal which has impressed thereon modulation corresponding to the signal applied to modulator 34 from filter 36. By way of example, microwave oscillator 12 may take the form of a reflex, velocity modulated electron tube and modulator 34 may be an amplifier for supplying a modulating signal to the repeller electrode thereof. Suitable provisions may be made in the amplifier for supplying the usual direct component of the repeller electrode potential. The circuit of the above example will provide an output signal that is frequency modulated in accordance with the signal from filter 36.

Figure 2:
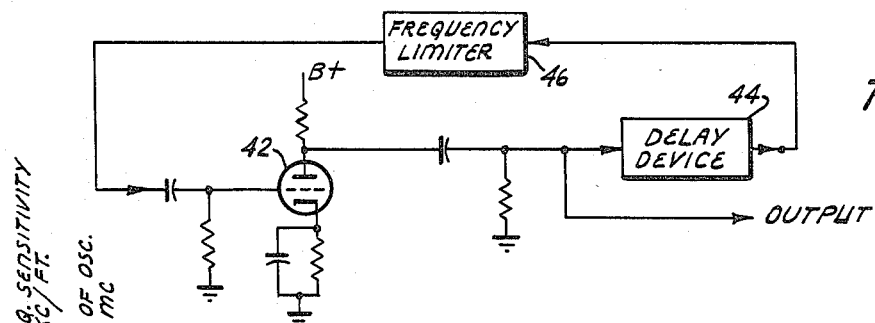
Fig. 2 is a partially schematic diagram of a circuit illustrating the principle of operation of the present invention.

The operation of the present invention will best be understood by first considering the operation of the circuit of Fig. 2. The circuit of Fig. 2 constitutes an oscillator circuit in which the frequency of oscillation is controlled in a manner equivalent to the manner in which the frequency of oscillation of the present invention is determined. In the circuit of Fig. 2, triode 42 and associated connections comprise a conventional limiting resistance coupled amplifier stage. The output of amplifier 42 is known to be inverted with respect to the input signal. If only sinusoidal waves or certain other symmetrical waves are to be amplified, this inversion can be considered to be a shift in phase of one-half cycle or 180 degrees. The output of amplifier 42 is connected through the series combination of delay device 44 and a frequency limiter 46 to the input of amplifier 42. Suppose now that a sinusoidal signal having a half period equal to the delay time of delay line 44 is applied to the input of amplifier 42. This signal will undergo a 180 degree phase shift in amplifier 42 and a second 180 degree phase shift in passing through delay device 44. Assuming no delay in frequency limiter 46, the signal in the output of delay device 44 will be applied to the input of amplifier 42 in phase with the originally applied signal. If the gain around the loop formed by amplifier 42, delay device 44 and frequency limiter 46 is made unity for this particular frequency, the system of Fig. 2 will oscillate at constant amplitude. If the delay time of delay device 44 is changed, the frequency of oscillation of the system will also change since the new delay time represents a phase shift of 180 degrees at different frequency.

The operation of the system of Fig. 2 is complicated by the fact that the circuit will oscillate at certain harmonics of the lowest frequency of oscillation. This causes the oscillatory signal to assume the form of short pulses spaced in time by an interval equal to the delay time of delay device 44. If the range of delays over which the system is to operate is such that the lowest frequency is greater than one half of the highest frequency, these higher frequencies may be eliminated and the system may be caused to oscillate in a sinusoidal manner by including in the loop a simple sharp cutoff, low pass filter having a cutoff frequency equal to, or only slightly greater than, the frequency of the oscillator of Fig. 2 with delay device 44 adjusted to give a minimum delay. If the lowest possible frequency of operation is less than one half the highest possible frequency of operation, for example one fourth of the highest frequency, a sharp cutoff filter having a substantially flat frequency response up to cutoff will not prevent the circuit from oscillating at the lowest frequency and at least one harmonic of this frequency. Therefore, if the oscillator is to be operated over a frequency range greater than two to one, the higher frequencies are preferably eliminated and the system caused to oscillate with a sinusoidal output signal at the lowest possible frequency of oscillation by the combination of a frequency limiter 46 having a gain versus frequency characteristic as shown in Fig. 3 and the amplitude limiting properties of amplifier 42. As explained above, the gain versus frequency characteristic of Fig. 3 may be obtained by a simple π or T filter network including series inductance and shunt capacitance. The amplitude limiting characteristics of amplifier 42 are such that it stabilizes its gain by self bias in order that oscillation around the entire loop for the signal of greatest amplitude in the output of frequency limiter 46 is just preserved. The signal with the greatest amplitude will be the one attenuated the least in frequency limiter 46 which, in this case, is the lowest possible frequency of oscillation. The gain around the entire loop for higher frequencies will not be sufficient to preserve oscillation at these frequencies because of the greater attenuation of the higher frequencies by frequency limiter 46.

Referring once more to the system of Fig. 1, the equivalent of delay device 44 of Fig. 2 is provided by the space link between antenna 10 and antenna 18. The length of this space link and hence the delay introduced into the loop will vary as a direct function of the altitude of antennas 10 and 18. The amplification afforded by amplifier 42 of Fig. 2 is provided, in circuit of Fig. 1, by intermediate frequency amplifier 26, detector 28, amplifier 32 and modulator 34. In intermediate frequency amplifier 26 and modulator 34 the modulation component represents the true oscillatory signal of the system and only the amplification which this component experiences is significant so far as achievement of results according to the invention is concerned. Filter 36 of Fig. 1 corresponds directly to frequency limiter 46 of Fig. 2. It should be obvious that the addition and subtraction of a microwave carrier as the signal passes around the oscillatory loop will not alter the general mode of operation of the device. Any incidental phase shifts introduced by the various elements of the system only serve to limit the zero-distance frequency of oscillation and to shift slightly the frequency of oscillation at distances other than zero. It should also be obvious that it is only the frequency of the signal produced and not the amplitude of the signal that is useful in determining distance or altitude and for this reason automatic gain control circuits or amplitude limiters may be employed whenever convenient. Furthermore, amplitude modulation of the signal in the space link may be used interchangeably with frequency modulation. The frequency of oscillation of the system of Fig. 1 may be measured most conveniently at some point between the output of detector 28 and the input of modulator 34 since a signal at the true frequency of oscillation appears in this portion of the system. The systems of Figs. 1 and 2 have been described in terms of a single stage of amplification providing a phase shift of 180 degrees. If the amplifier includes an even number of stages and has a phase shift equal to a multiple of 360 degrees, the system will oscillate at a frequency such that the delay time of the delay means is equal to a full period of the signal.

Figure 4:
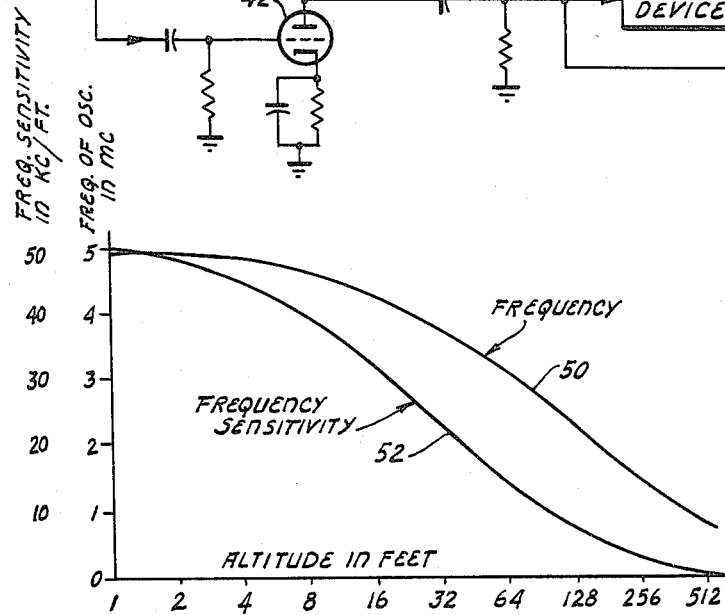
Fig. 4 is a second plot illustrating the overall frequency response characteristics of a typical embodiment of the system of Fig. 1.

Fig. 4 illustrates the response of a system similar to that shown in Fig. 1 for an assumed total delay exclusive of the space link of 0.2 microsecond. The zero distance frequency of oscillation will be equal to the reciprocal of this delay time or 5 megacycles per second. The frequencies of oscillation for the various altitudes within the limit of Fig. 4 are shown by curve 50. The change in frequency for a unit change in amplitude at each of the various altitudes is shown by curve 52. From curve 52 it can be seen that the system is most sensitive and, therefore, will indicate total altitude with the greatest accuracy at altitudes near zero. This characteristic makes the system of Fig. 1 ideally suited for use as a low altitude measuring device.

It is believed that the various steps in the novel method of measuring distances specifically recited in the claims can be identified from the above description of the system employed to implement the method. Further, it is believed that the method of operating the system to measure distance rather than altitude should be apparent without further explanation. A few of the many possible modifications falling within the scope of the present invention as defined by the appended claims have been pointed out in conjunction with the description of the circuit of Fig. 1. These modifications are not the only ones that can be made and the inclusion of a few such modifications should not be construed as excluding others equally apparent.

What is claimed is:

1. A method of measuring distance including the steps of radiating into space in a directive beam at the initial point of the distance to be measured a modulated, high frequency electromagnetic signal, receiving said modulated high frequency signal at the terminal point of the distance to be measured, detecting the modulation component of said received signal, causing said modulation component to produce the said modulation on said transmitted signal, limiting the frequency of the modulation on said transmitted signal to the lowest possible value, amplifying the said modulation component to a degree such that the system is self energizing as to said modulating component, and measuring the frequency of said modulation component to obtain a measure of said distance.

2. A method of measuring the altitude above the earth's surface of a point in space, said method including the steps of radiating in a directive beam directed toward the earth's surface from said point in space a modulated, high frequency electromagnetic signal, receiving said radiated signal at said point in space after reflection from the earth's surface, detecting the modulation component of said received signal, causing said detected modulation component to produce the said modulation on said transmitted signal, limiting the frequency of the modulation component impressed on said transmitted signal to the lowest possible value, amplifying the said modulation component by an amount equal to the attenuation of said modulation component during transmission and reception, and measuring the frequency of said modulation component to obtain a measure of the said altitude.

3. A distance measuring system comprising a closed loop oscillatory electrical circuit, said circuit including a space link equal in length to the distance to be measured as part of said closed loop, said circuit further including radio frequency transmitting and receiving means for propagating the oscillatory signal of said system through said space link, said circuit having an overall gain of unity around said loop and including said space link for only the lowest possible frequency of oscillation of said system, the gain of said circuit being less than unity for signals having a frequency greater than said lowest possible frequency of oscillation and means for measuring the frequency at which said system oscillates, said frequency being a function of the length of said space link.

4. A distance measuring system comprising a radio frequency transmitting system including means for radiating a signal into space at the initial point of the distance to be measured, a radio frequency receiving system including means for receiving a portion of said radiated signal at the terminal point of said distance to be measured, a detector coupled to said receiving means for detecting a modulation component of said received signal, means associated with said transmitting system for modulating said radiated signal, a low pass filter circuit coupling the output of said detector to said modulating means thereby to cause said radiated signal to be modulated by said detected modulation component, means included between the input of said receiving means and said modulating means for amplifying said modulation component and means for measuring the frequency of said modulation component.

5. A distance measuring system comprising a microwave electromagnetic energy transmitting system including a directive antenna located at the initial point of said distance to be measured, an electromagnetic energy receiving system including an antenna located at the terminal point of said distance to be measured for receiving energy from said antenna at said initial point, a detector coupled to said receiving means for detecting a modulation component of the received signal, amplifying means coupled to the output of said detector, said amplifying means having gain control means associated therewith adapted to maintain the output level of said amplifying means at a constant amplitude, means associated with said transmitting system for modulating the radiated signal, a filter circuit coupling the output of said amplifying means to said modulating means thereby to cause said radiated signal to be modulated by said detected modulation component, said filter circuit having an output signal to input signal ratio which decreases with increasing frequency and means for measuring the frequency of said modulation component.

6. A system for measuring the altitude of a point in space with respect to the surface of the earth, said altitude measuring system comprising, an electromagnetic energy transmitting system including a directive antenna located at said point in space, said antenna being adapted to radiate energy in a directed beam toward the surface of the earth, an electromagnetic energy receiving system located at said point in space including an antenna for receiving a portion of said radiated energy after reflection from the surface of the earth, a detector coupled to said receiving antenna for detecting a modulation component of said received energy, a constant output level amplifying means coupled to the output of said detector, means associated with said transmitting system for modulating said radiated energy, a filter circuit coupling the output of said amplifying means to said modulating means thereby to cause said radiated energy to be modulated by said detected modulation component, said filter circuit having an output signal to input signal ratio which decreases with increasing frequency and means for measuring the frequency of said modulation component.

7. A distance measuring system comprising the following elements connected in a series relationship, a receiving antenna, a mixer, an intermediate frequency amplifier, a detector, a signal amplifier with automatic gain control, a low pass filter, a modulator, a transmitting oscillator and a transmitting antenna, said transmitting and receiving antennas being disposed at the initial and terminal points of said distance to be measured and oriented so as to exchange radiant electromagnetic energy over said distance to be measured, a local oscillator coupled to said mixer, and means for measuring the frequency of the signal in the output of said detector.

8. A distance measuring system comprising a microwave electromagnetic energy transmitting system including a directive antenna located at the initial point of said distance to be measured, an electromagnetic energy receiving system including an antenna located at the terminal point of said distance to be measured for receiving energy from said antenna at said initial point, a detector coupled to said receiving means for detecting a modulation component of the received signal, amplifying means coupled to the output of said detector, said amplifying means having gain control means associated therewith adapted to maintain the output level of said amplifying means at a constant amplitude, means associated with said transmitting system for modulating the radiated signal, a low pass filter circuit coupling the output of said amplifying means to said modulating means thereby to cause said radiated signal to be modulated by said detected modulation component, said low pass filter having a gain-frequency characteristic such that the gain of the filter decreases as the frequency increases, and means for measuring the frequency of said modulation component.

9. The method of measuring distance which includes the steps of transmitting a wave at the initial point of the distance to be measured, receiving said wave at the terminal point of said distance to be measured, said received wave having a periodic component thereof shifted in phase with respect to said transmitted wave by an amount proportional to said distance to be measured, amplifying the received wave and thereby imparting to said periodic component of said received wave a second phase shift, limiting the amplification of said received wave to a value such that the amplification of said periodic component is equal to the attenuation of said periodic component between the output and the input of the means providing the amplification, filtering said received wave to attenuate components thereof harmonically related to said periodic component to a greater degree than said periodic component, utilizing said filtered, amplified wave as the transmitted wave, whereby an oscillatory system is established which oscillates at a frequency such that the sum of said two phase shifts is an integral multiple of a period of said periodic component, and measuring the frequency of said periodic component thereby to obtain a measure of said distance.

10. The method of measuring distance which includes the steps of transmitting a wave at the initial point of the distance to be measured, receiving said wave at the terminal point of said distance to be measured, said received wave having a periodic component thereof shifted in phase with respect to said transmitted wave by an amount proportional to said distance to be measured, amplifying the received wave and thereby imparting to said periodic component of said received wave a second phase shift, utilizing said amplified wave as the transmitted wave, whereby an oscillatory system is established which oscillates at a frequency such that the sum of said two phase shifts is an integral multiple of a period of said periodic component, suppressing components of the received wave having a phase shift equal to an integral number of periods greater than one, and measuring the frequency of said periodic component thereby to obtain a measure of said distance.

11. The method of measuring distance which includes the steps of modulating a relatively high frequency carrier wave with a relatively low frequency periodic wave, transmitting said modulated wave at the initial point of the distance to be measured, receiving said modulated wave at the terminal point of the distance to be measured, demodulating said received wave to recover said low frequency periodic wave, said recovered low frequency periodic wave being shifted in phase with respect to the low frequency modulating wave by an amount proportioned to the distance to be measured, amplifying the recovered low frequency periodic wave thereby imparting to said recovered low frequency periodic wave a second phase shift, utilizing said amplified low frequency periodic wave as said low frequency modulating wave whereby an oscillatory system is established which oscillates at a frequency such that the sum of said two phase shifts is an integral multiple of a period of said low frequency periodic wave, and measuring the frequency of said low frequency periodic wave thereby to obtain a measure of said distance.

12. The method of measuring distance which includes the steps of modulating a relatively high frequency carrier wave with a relatively low frequency periodic wave, transmitting said modulated wave at the initial point of the distance to be measured, receiving said modulated wave at the terminal point of the distance to be measured, demodulating said received wave to recover said low frequency periodic wave, said recovered low frequency periodic wave being shifted in phase with respect to the low frequency modulating wave by an amount proportioned to the distance to be measured, amplifying the recovered low frequency periodic wave to a level equal to the level of said low frequency modulating wave, thereby imparting to said low frequency periodic wave a second phase shift, attenuating by increasingly higher amounts the increasingly higher frequency components of said amplified low frequency periodic wave, utilizing said amplified low frequency periodic wave as said low frequency periodic modulating wave, whereby an oscillatory system is established which oscillates substantially sinusoidally at a frequency such that the sum of said two phase shifts is an integral multiple of a period of said low frequency periodic wave, and measuring the frequency of said low frequency periodic wave thereby to obtain a measure of said distance.

13. The method of measuring distance which includes the steps of modulating a relatively high frequency carrier wave with a relatively low frequency substantially sinusoidal periodic wave, transmitting said modulated wave at the initial point of the distance to be measured, receiving said modulated wave at the terminal point of the distance to be measured, demodulating said received wave to recover said low frequency periodic wave, said recovered periodic wave being shifted in phase with respect to said modulating periodic wave by an amount proportional to the distance to be measured, amplifying the recovered periodic wave to a predetermined level, thereby imparting to said periodic wave a second phase shift, filtering said amplified periodic wave to suppress harmonics of said periodic wave, utilizing said amplified periodic wave as said modulating wave whereby an oscillatory system is established which oscillates substantially sinusoidally at a frequency such that the sum of said two phase shifts is an integral multiple of a period of said periodic wave, and measuring the frequency of said low frequency wave thereby to obtain a measure of said distance.

14. The method of measuring distance which includes the steps of modulating a relatively high frequency carrier wave with a relatively low frequency substantially sinusoidal periodic wave, transmitting said modulated wave into space at the initial point of the distance to be measured in a directive beam oriented along the distance to be measured, receiving said modulated wave at the terminal point of the distance to be measured, demodulating said received wave to recover said low frequency periodic wave, said recovered periodic wave being shifted in phase with respect to said modulating periodic wave by an amount proportional to the distance to be measured, amplifying the recovered periodic wave to a predetermined level, thereby imparting to said periodic wave a second phase shift, filtering said amplified periodic wave to provide progressively higher attenuation for progressively higher frequency components of said demodulated wave, utilizing said filtered periodic wave as said modulating wave whereby an oscillatory system is established which oscillates substantially sinusoidally at a frequency such that the sum of said two phase shifts is an integral multiple of a period of said periodic wave, and measuring the frequency of said low frequency periodic wave thereby to obtain a measure of said distance.

15. A distance measuring system comprising a signal amplifying device, means regeneratively coupling the output of said signal amplifying device to the input thereof, said last-mentioned means including a space link equal in length to the distance to be measured, said amplifying device having a gain equal to the attenuation of said regenerative coupling means only for a signal having a total phase shift in said signal amplifying device and said regenerative coupling means equivalent to a single period of said signal, said system thereby being arranged to oscillate at a single frequency determined by the length of said space link, and means for measuring the frequency of oscillation of said system.

16. A distance measuring system comprising a signal amplifying device, means regeneratively coupling the output of said signal amplifying device to the input thereof, said last-mentioned means including a space link equal in length to the distance to be measured, said amplifying device having a gain equal to the attenuation of said regenerative coupling means for a signal having a total phase shift in said amplifying device and said regenerative coupling means equivalent to a single period of said signal, said system thereby being arranged to oscillate at a frequency determined by the length of said space link, filter means included in said regenerative coupling means, said filter providing progressively higher attenuation for progressively higher frequency signals, and means for measuring the frequency of oscillation of said system.

References Cited in the file of this patent

UNITED STATES PATENTS

| | | |
|---|---|---|
| 1,945,952 | Nicolson | Feb. 6, 1934 |
| 2,169,374 | Roberts | Aug. 15, 1939 |
| 2,257,830 | Wolff | Oct. 7, 1941 |
| 2,268,643 | Crosby | Jan. 6, 1942 |
| 2,400,309 | Koch | May 14, 1946 |
| 2,424,263 | Woodyard | July 22, 1947 |
| 2,537,593 | Landon | Jan. 9, 1951 |
| 2,543,782 | Kiebert | Mar. 6, 1951 |